US006807027B2

(12) United States Patent
McGeehin et al.

(10) Patent No.: US 6,807,027 B2
(45) Date of Patent: Oct. 19, 2004

(54) RUTHENIUM AS NON-MAGNETIC SEEDLAYER FOR ELECTRODEPOSITION

(75) Inventors: Peter Kevin Mark McGeehin, Derry (IE); Alison Mary Bell, Derry (IE); Alan Biggar Johnston, Derry (IE)

(73) Assignee: Seagate Technology LLC, Scotts Valley, CA (US)

(*) Notice: Subject to any disclaimer, the term of this patent is extended or adjusted under 35 U.S.C. 154(b) by 59 days.

(21) Appl. No.: 10/321,043

(22) Filed: Dec. 17, 2002

(65) Prior Publication Data

US 2003/0189786 A1 Oct. 9, 2003

(30) Foreign Application Priority Data

Apr. 3, 2002 (GB) ............................................ 0207724

(51) Int. Cl.[7] ............................................ G11B 5/147
(52) U.S. Cl. ............................................ 360/125
(58) Field of Search ................................ 360/125, 126

(56) References Cited

U.S. PATENT DOCUMENTS

| | | | | |
|---|---|---|---|---|
| 3,853,715 A | | 12/1974 | Romankiw | 204/15 |
| 4,780,781 A | | 10/1988 | Sano et al. | 360/126 |
| 5,224,002 A | | 6/1993 | Nakashima et al. | 360/126 |
| 5,801,909 A | | 9/1998 | Gray et al. | 360/126 |
| 5,805,392 A | | 9/1998 | Mallary et al. | 360/113 |
| 5,812,350 A | | 9/1998 | Chen et al. | 360/126 |
| 5,843,521 A | | 12/1998 | Ju et al. | 427/129 |
| 5,949,627 A | | 9/1999 | Williams et al. | 360/126 |
| 6,125,010 A | | 9/2000 | Keel et al. | 360/126 |
| 6,294,425 B1 | | 9/2001 | Hideki | 438/253 |
| 6,320,725 B1 | * | 11/2001 | Payne et al. | 360/125 |
| 6,741,421 B2 | * | 5/2004 | Mochizuki et al. | 360/125 |
| 2002/0039254 A1 | | 4/2002 | Taguchi et al. | |
| 2002/0071208 A1 | | 6/2002 | Batra et al. | |
| 2002/0080525 A1 | | 6/2002 | Sato et al. | |

* cited by examiner

*Primary Examiner*—Robert S. Tupper

(57) ABSTRACT

A perpendicular write head includes a main pole, a return pole, and conductive coils. The main pole includes a seedlayer and a magnetic layer that is plated upon the seedlayer. The seedlayer is nonmagnetic, electrically conductive, and corrosion-resistant. The return pole is separated from the main pole by a gap at an air bearing surface of the write head and is coupled to the main pole opposite the air bearing surface. The conductive coils are positioned at least in part between the main pole and the return pole.

20 Claims, 5 Drawing Sheets

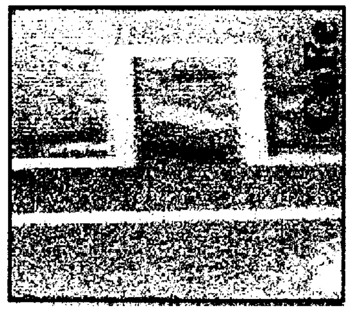
Fig. 8D (PRIOR ART)
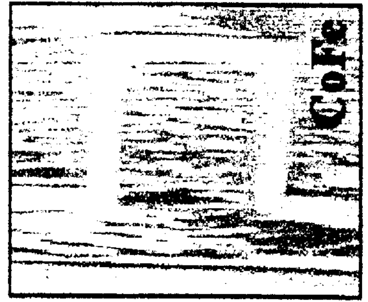
Fig. 9D
Fig. 8C
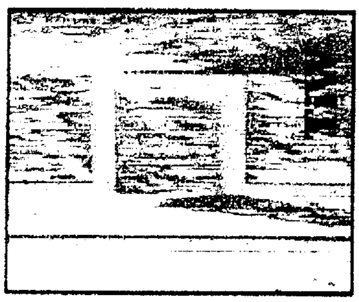
Fig. 9C
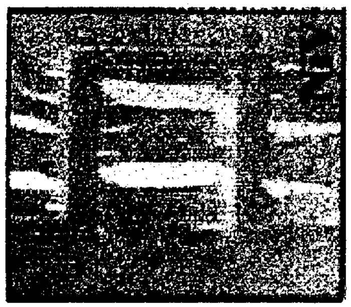
Fig. 8B
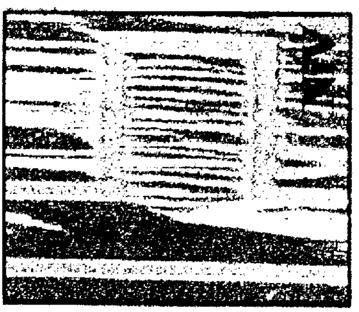
Fig. 9B
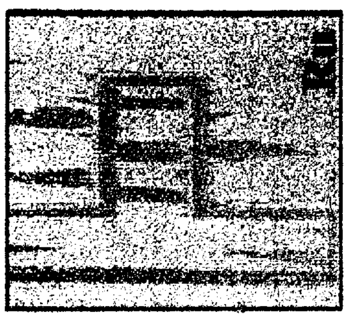
Fig. 8A
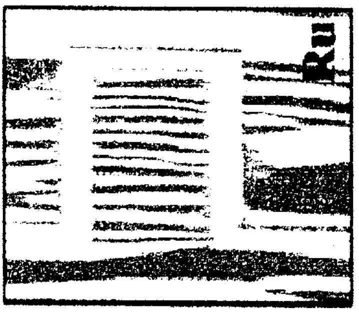
Fig. 9A

RUTHENIUM AS NON-MAGNETIC SEEDLAYER FOR ELECTRODEPOSITION

CROSS-REFERENCE TO RELATED APPLICATION(S)

This application claims the priority benefit of provisional British patent application serial number 0207724.6 of Peter Kevin Mark McGeehin, Alison Mary Bell, and Alan Biggar Johnston, filed on Apr. 3, 2002, entitled "Ruthenium As Non-Magnetic Seedlayer for Electrodeposition", and which is hereby incorporated by reference in its entirety.

BACKGROUND OF THE INVENTION

The present invention relates generally to the field of electronic data storage and retrieval systems. In particular, the present invention relates to a perpendicular write pole of a transducing head having a nonmagnetic seedlayer.

In an electronic data storage and retrieval system, a transducing head typically includes a writer for storing magnetically-encoded information on a magnetic disc and a reader for retrieving that magnetically-encoded information from the magnetic disc. The reader typically consists of two shields and a magnetoresistive (MR) sensor positioned between the shields. Magnetic flux from the surface of the disc causes rotation of the magnetization vector of a sensing layer of the MR sensor, which in turn causes a change in electrical resistivity of the MR sensor. This change in resistivity of the MR sensor can be detected by passing a current through the MR sensor and measuring a voltage across the MR sensor. External circuitry then converts the voltage information into an appropriate format and manipulates that information as necessary.

The writer typically consists of two magnetic poles, or a magnetic core, separated from each other at an air bearing surface (ABS) of the write head by a write gap and connected to each other at a region away from the ABS. Positioned between the two poles are one or more conductive coil layers encapsulated by insulating layers. The writer and the reader are often arranged in a merged configuration in which a shared pole serves as both a shield in the reader and a magnetic pole in the writer.

The magnetic poles can be deposited by either a sputtering-type process or by electrodeposition. In the latter case, an electrically-conductive seedlayer upon which the magnetic pole can be plated through a photoresist mask is necessary to allow for metal ion reduction and hence, formation of the pole. Conventionally, the seedlayer is formed of a material that is also magnetically-conductive, such that the seedlayer becomes a magnetically-active part of the pole.

The writer can be arranged as either a longitudinal writer or a perpendicular writer. In either case, the general structure of the writer is similar, although the actual operation and dimensions of its elements will differ substantially. In a longitudinal writer, the poles are commonly referred to as a bottom pole and a top pole, while in a perpendicular writer, the poles are commonly referred to as a return pole and a main pole.

To write data to a longitudinal magnetic media, a time-varying electrical current, or write current, is caused to flow through the conductive coil. The write current produces a time-varying magnetic field through the top and bottom poles that bridges the write gap between the two poles at the ABS of the transducing head. The longitudinal magnetic media is passed near the ABS of the transducing head at a predetermined distance such that a magnetic surface of the media passes through the magnetic field. As the write current changes direction, the magnetic field changes in intensity and direction. This type of writer is referred to as a longitudinal writer because the generated magnetic field causes bits to be written to the magnetic media in the plane of the magnetic media.

A perpendicular magnetic media differs from a longitudinal magnetic media in the direction in which the magnetization in the recording surface is held. For a longitudinal media, the magnetization is held in a direction substantially parallel to the surface of the media, while for a perpendicular media, the magnetization is held in a direction substantially normal to the surface of the media. To enable data to be perpendicularly recorded, perpendicular media generally are formed of two layers: a soft magnetic underlayer having high permeability and a media layer having high perpendicular anisotropy.

To write data to the perpendicular magnetic media, a time-varying write current is caused to flow through the conductive coil, which in turn produces a time-varying magnetic field through the main pole and the return pole. The magnetic media is then passed near the ABS of the writer at a predetermined distance such that the media passes through the magnetic field. With a perpendicular writer, the main and return poles are spaced further apart than the top and bottom poles of the longitudinal writer, and the underlayer of the magnetic media in essence acts as a third pole of the writer; that is, the magnetic field bridges the gap from main pole to the underlayer, passing through the media layer, and then subsequently bridges the gap between the underlayer and return pole, again passing through the media layer. To ensure that the magnetic field does not write data on this return path, the return pole is substantially larger than the main pole at the ABS such that the magnetic field through the media layer will not be concentrated sufficiently to overcome the intrinsic magnetization of the media.

Perpendicular writers currently are being pursued as an option over longitudinal writers for increasing areal bit density of magnetic media. As described above, the main pole of a perpendicular writer is generally formed by plating a magnetic material through a photoresist mask, which in turn requires the deposition of an electrically-conductive seedlayer. Conventionally, this seedlayer is formed of a material that is also magnetically-conductive, such that the seedlayer becomes a magnetically-active part of the pole.

Importantly, when designing a perpendicular writer, a thickness of the main pole at the ABS is preferably minimized to diminish off-track writing at skew. Additionally, only a trailing edge of the main pole of a perpendicular writer contributes to the writing process. Thus, a thicker main pole will not improve the quality of the written data. Conventionally, a longitudinal writer will have a thickness in a range of about one micrometer to about two micrometers, while a perpendicular writer will have a thickness of less than about one micrometers. The conventional magnetic seedlayers upon which the main pole is plated, however, make it difficult to minimize the thickness of the main pole. Also, because the writer leaves an imprint of a shape of the main pole at the ABS on the media, a square-shaped main pole is preferred. Again, the conventional magnetic seedlayers contribute to the aspect ratio of the main pole, rendering the main pole less square in shape.

BRIEF SUMMARY OF THE INVENTION

A perpendicular write head includes a main pole, a return pole, and conductive coils. The main pole includes a seedlayer and a magnetic layer that is plated upon the seedlayer. The seedlayer is nonmagnetic, electrically conductive, and corrosion-resistant. The return pole is separated from the main pole by a gap at an air bearing surface of the write head and is coupled to the main pole opposite the air bearing surface. The conductive coils are positioned at least in part between the main pole and the return pole.

BRIEF DESCRIPTION OF THE DRAWINGS

FIGS. 8A–8D are easy axis Kerrscope images of a cobalt-nickel-iron feature plated and patterned on a respective one of a ruthenium seedlayer, a nickel-vanadium seedlayer, a titanium-tungsten seedlayer, and a prior art cobalt-iron seedlayer.

FIGS. 9A–9D are hard axis Kerrscope images of a cobalt-nickel-iron feature plated and patterned on a respective one of a ruthenium seedlayer, a nickel-vanadium seedlayer, a titanium-tungsten seedlayer, and a prior art cobalt-iron seedlayer.

DETAILED DESCRIPTION

Figure 1:
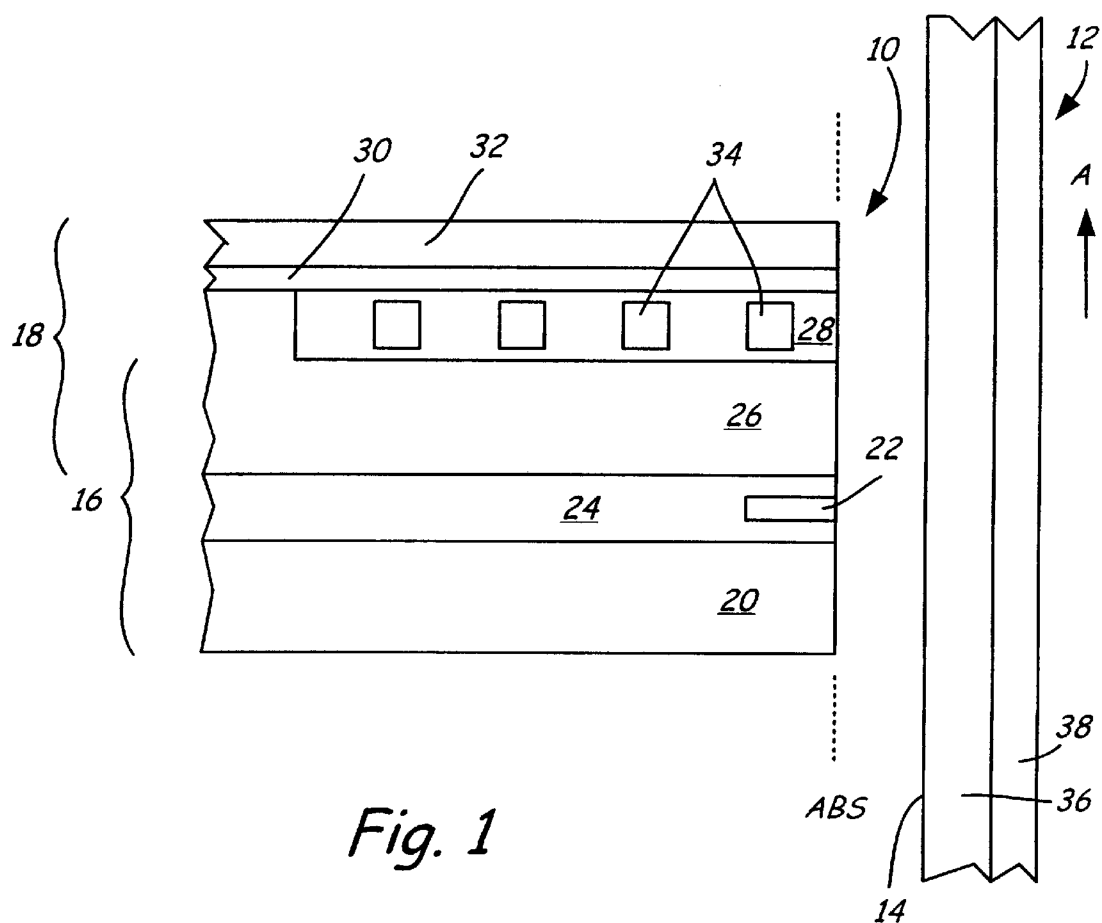
FIG. 1 is a cross-sectional view of a transducing head in accord with the present invention.

FIG. 1 is a cross-sectional view of transducing head 10 and magnetic disc 12 in accord with the present invention. The cross-section of FIG. 1 is taken substantially normal to an air bearing surface (ABS) of transducing head 10. FIG. 1 illustrates transducing head 10 and its placement relative to magnetic disc 12. The ABS of transducing head 10 faces disc surface 14 of magnetic disc 12. Magnetic disc 12 travels or rotates in a direction relative to transducing head 10 indicated by arrow A. The spacing between the ABS of transducing head 10 and disc surface 14 is preferably minimized while avoiding contact between transducing head 10 and magnetic disc 12. In most cases, contact between transducing head 10 and magnetic disc 12 would destroy both magnetic transducing head 10 and magnetic disc 12.

Transducing head 10 includes magnetoresistive (MR) reader 16 and perpendicular writer 18. MR reader 16 includes bottom shield 20, MR read element 22, insulating layer 24, and top shield/return pole 26. MR read element 22 is positioned within insulating layer 24 adjacent to the ABS between terminating ends of bottom shield 20 and top shield/return pole 26. Bottom shield 20 and top shield/return pole 26 function to ensure that MR read element 22 reads only the information stored directly beneath it on a specific track of magnetic disc 12 by absorbing any stray magnetic fields emanating from adjacent tracks and transitions. MR read element 22 may be any of a variety of different types of read elements, such as an anisotropic MR read element or a giant magnetoresistive (GMR) read element. In operation, magnetic flux from a surface of magnetic disc 12 causes rotation of a magnetization vector of a sensing layer of MR read element 22, which in turn causes a change in electrical resistivity of MR read element 22. The change in resistivity of MR read element 22 can be detected by passing a current through MR read element 22 and measuring a voltage across MR read element 22. Insulating layer 24 insulates MR read element 22 from each of bottom shield 20 and top shield/return pole 26.

Perpendicular writer 18 includes top shield/return pole 26, insulating layer 28, main pole seedlayer 30, main pole 32, and conductive coil 34. Top shield/return pole 26 and main pole seedlayer 30 are separated from each other at the ABS by insulating layer 28, and are magnetically connected to each other opposite the ABS. Main pole 32 is formed on main pole seed layer 30 opposite insulating layer 28. Electrically conductive coil 34 is positioned at least in part in insulating layer 28 between top shield/return pole 26 and main pole seedlayer 30. Conductive coil 34 wraps around at least one of top shield/return pole 26 and main pole 32, such that a flow of electrical current through conductive coil 34 generates a magnetic field in top shield/return pole 26 and main pole 32. While FIG. 1 shows a single layer of conductive coils 34, it is understood in the art that several layers of conductive coils may be used separated by several insulating layers. Transducing head 10 is a merged MR head in which top shield/return pole 26 is employed both as a top shield in MR reader 16 and as a return pole in perpendicular writer 18. If transducing head 10 were a piggyback MR head, top shield/return pole 26 would be formed of separate layers.

During fabrication of transducing head 10, magnetic main pole 32 is deposited by electrodeposition in which main pole seedlayer 30 is formed of an electrically-conductive material upon which main pole 32 can be plated through a photoresist mask. Conventionally, main pole seedlayer 30 is formed of a material that is also magnetically-conductive, such as nickel-iron, such that main pole seedlayer 30 becomes a magnetically-active part of main pole 32, resulting in main pole 32 having an effective thickness greater than its actual thickness. As described above in the background section, however, the effective thickness of main pole 32 is preferably minimized to diminish off-track writing at skew.

The present invention recognizes that the effective thickness of main pole 32 can be minimized by selecting a material for main pole seedlayer 30 that does not become a magnetic part of main pole 32; that is, by selecting a nonmagnetic material. Preferably, the material selected for main pole seedlayer 30 also promotes a low magnetic coercivity in main pole 32; more specifically, the material preferably promotes a magnetic coercivity greater than about 3 oersteds, and most preferably, greater than about 1 oersted. A lower magnetic coercivity allows for quicker writing, that is, a direction of the magnetic field generated by the writer can be more quickly reversed. The material selected for main pole seedlayer 30 preferably also is resistant to corrosion. Additionally, the material selected for main pole seedlayer 30 preferably will not induce Galvanic corrosion in the material that forms main pole 32, thus effectively eliminating the noble metals such as gold, silver, and platinum from use as main pole seedlayer 30. Moreover, the material selected for main pole seedlayer 30 preferably promotes desired roughness and resistivity in main pole 32. Most preferably, main pole seedlayer 30 is formed of ruthenium, nickel-vanadium, or titanium-tungsten.

To enable data to be perpendicularly recorded, perpendicular magnetic disc 12 generally is formed of two layers: soft magnetic underlayer 38 having high permeability and media layer 36 having high perpendicular anisotropy.

To write data to the perpendicular magnetic disc 12, a time-varying write current is caused to flow through conductive coil 34, which in turn produces a time-varying magnetic field through top shield/return pole 26 and main pole 32. Magnetic disc 12 is then passed over the ABS of writer 18 at a predetermined distance such that disc 12 passes through the magnetic field. Underlayer 38 of magnetic disc 12 in essence acts as a third pole of writer 18; that is, the magnetic field bridges the gap from main pole 32 to underlayer 38, passing through media layer 36 of magnetic disc 12, and then subsequently bridges the gap between underlayer 38 and top shield/return pole 26, again passing through media layer 36. To ensure that the magnetic field does not write data on this return path, top shield/return pole 26 is substantially larger than main pole 32 at the ABS such that the magnetic field through media layer 36 will not be concentrated sufficiently to overcome the intrinsic magnetization of media layer 36.

Figure 2:
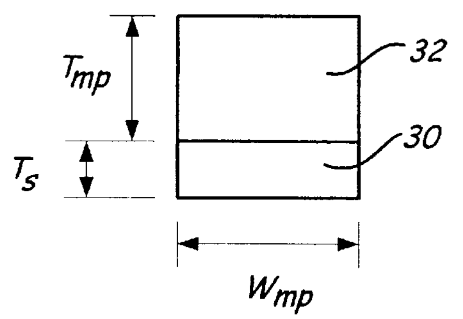
FIG. 2 is an air bearing view of a main pole and a main pole seedlayer of the transducing head of FIG. 1.

FIG. 2 is an air bearing view of main pole seedlayer 30 and main pole 32 of transducing head 10 of FIG. 1. Preferably, main pole seedlayer 30 and main pole 32 each have a width $W_{MP}$ in a range of about 0.05 micrometers to about 1 micrometer, most preferably in a range of about 0.1 micrometers to about 0.3 micrometers, while main pole seed layer 30 has a thickness $T_S$ in a range of about 0.025 micrometers to about 0.1 micrometers and main pole 32 has a thickness $T_{MP}$ such that an overall thickness of both main pole seedlayer 30 and main pole 32 is in a range of about 0.1 micrometers to about 1 micrometer. Additionally, main pole 32 preferably has a substantially rectangular shape along the ABS; that is, width $W_{MP}$ of main pole 32 is preferably substantially equal to thickness $T_{MP}$ of main pole 32. Thus, a width-to-thickness aspect ratio of main pole 32 is preferably in a range of about 0.95 to about 1.05, and most preferably about 1.

Figure 3:
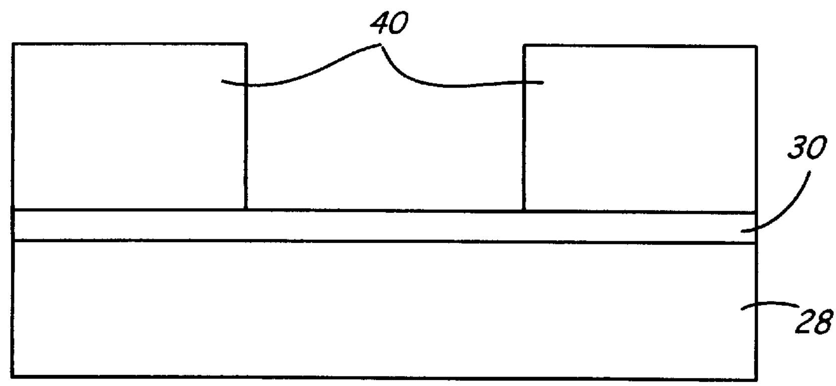
FIGS. 3–6 are cross-sectional views illustrating a method for forming the main pole of the transducing head of FIG. 1.
Figure 4:
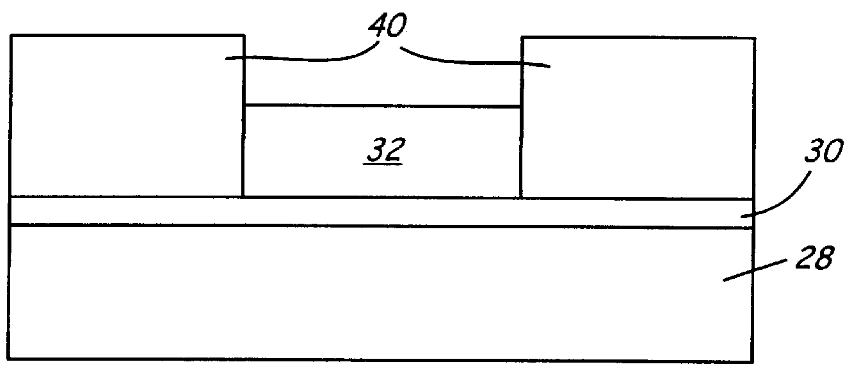
Figure 5:
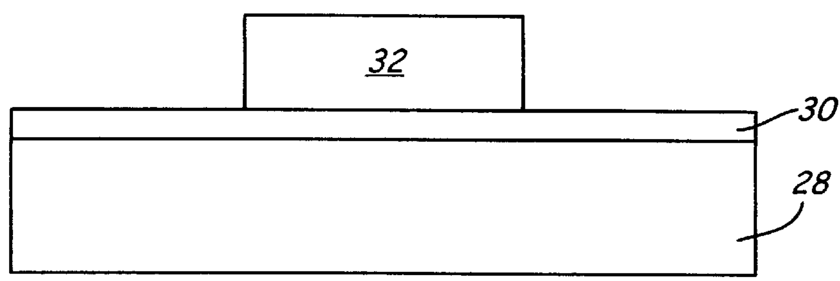
Figure 6:
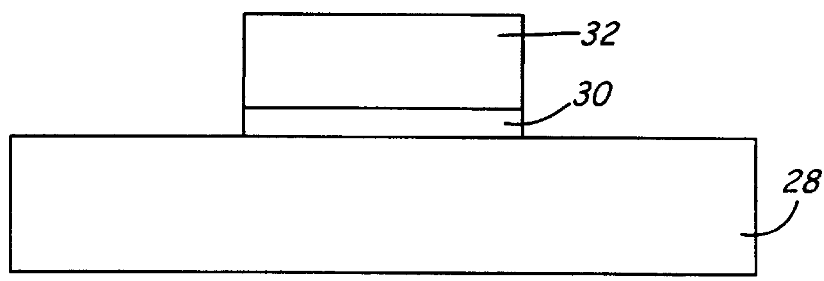

FIGS. 3–6 are cross-sectional views illustrating a method for forming main pole 32 of transducing head 10 of FIG. 1. In FIG. 3, main pole seedlayer 30 is deposited on insulating material 28, and mask 40 is deposited onto main pole seedlayer 30, both depositions being via conventional means. Mask 40 functions to define a shape of main pole 32. In FIG. 4, main pole 32 is plated onto an unmasked portion of main pole seedlayer 30 not covered by mask 40. In FIG. 5, mask 40 is removed. And, in FIG. 6, the previously-masked portion of main pole seedlayer 30 is removed via a milling process, which milling process also thins main pole 32.

The inventors of the present invention performed an experiment to investigate the effect of a nonmagnetic main pole seedlayer on the properties of a main pole plated thereon. FIGS. 7–9 illustrate results of this experiment. In the experiment, a cobalt-nickel-iron sheet film having a magnetic moment of about 1.8 Tesla was plated onto four different seedlayer materials; namely (a) ruthenium, (b) nickel-vanadium, (c) titanium-tungsten, and (d) prior art cobalt-iron. The seedlayers were each deposited to 1000 Angstroms thick on AlTiC wafers. The magnetic properties of the four cobalt-nickel-iron sheet films were then measured and plotted using a B-H looper. Next, resistivity and roughness of the four cobalt-nickel-iron sheet films were measured. Finally, each seedlayer and cobalt-nickel-iron sheet film sample was patterned to form a large feature that was analyzed with a Kerrscope to investigate domain wall formation along both the easy and hard axis of the samples.

Figure 7A:
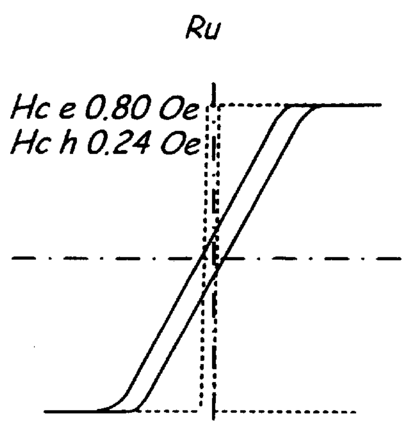
FIGS. 7A–7D are B–H graphs illustrating a magnetic coercivity of a cobalt-nickel-iron sheet film plated on a respective one of a ruthenium seedlayer, a nickel-vanadium seedlayer, a titanium-tungsten seedlayer, and a prior art cobalt-iron seedlayer.
Figure 7B:
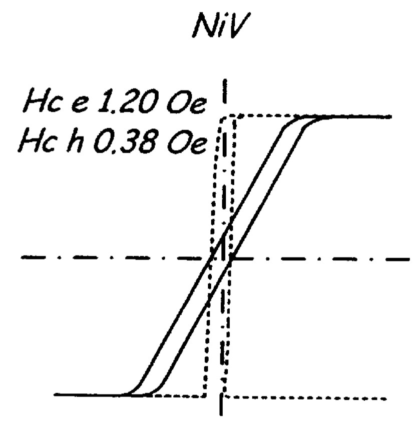
Figure 7C:
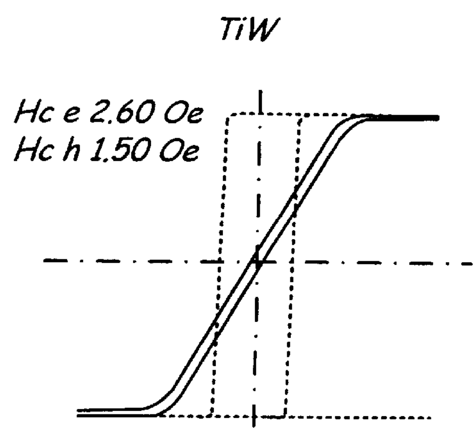
Figure 7D:
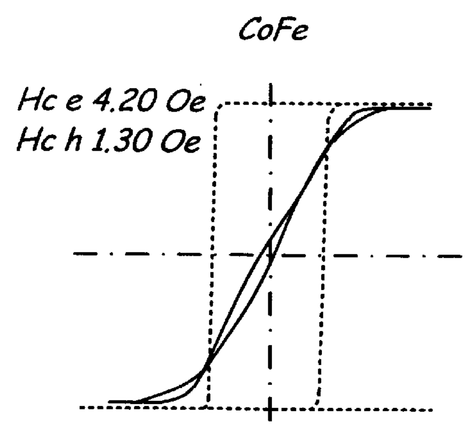

FIGS. 7A–7D are B–H graphs illustrating a magnetic coercivity of the cobalt-nickel-iron sheet films plated on a respective one of a ruthenium seedlayer (FIG. 7A), a nickel-vanadium seedlayer (FIG. 7B), a titanium-tungsten seedlayer (FIG. 7C), and a prior art cobalt-iron seedlayer (FIG. 7D). As shown in these figures, the prior art magnetic cobalt-iron seedlayer yielded a sheet film having an easy axis magnetic coercivity of 4.20 oersteds and a hard axis magnetic coercivity of 1.30 oersteds, while each of the nonmagnetic seedlayers yielded lower magnetic coercivity. Specifically, the ruthenium seedlayer resulted in a sheet film having an easy axis magnetic coercivity of 0.80 oersteds and a hard axis magnetic coercivity of 0.24 oersteds, the nickel-vanadium seedlayer yielded a sheet film having an easy axis magnetic coercivity of 1.20 oersteds and a hard axis magnetic coercivity of 0.38 oersteds, and the titanium-tungsten seedlayer yielded a sheet film having an easy axis magnetic coercivity of 2.60 oersteds and a hard axis magnetic coercivity of 1.50 oersteds.

FIGS. 8A–8D are easy axis Kerrscope images of a patterned large 1.8 Tesla CoNiFe feature plated on a respective one of a ruthenium seedlayer (FIG. 8A), a nickel-vanadium seedlayer (FIG. 8B), a titanium-tungsten seedlayer (FIG. 8C), and a prior art cobalt-iron seedlayer (FIG. 8D). Similarly, FIGS. 9A–9D are hard axis Kerrscope images of the patterned large 1.8 Tesla CoNiFe feature plated on a respective one of a ruthenium seedlayer (FIG. 9A), a nickel-vanadium seedlayer (FIG. 9B), a titanium-tungsten seedlayer (FIG. 9C), and a prior art cobalt-iron seedlayer (FIG. 9D). In both cases, features formed on a nonmagnetic seedlayer had fewer, more stable domains than the feature formed on the magnetic, cobalt-iron seedlayer, with the fewest and most stable feature resulting from the ruthenium sample.

Figure 10:
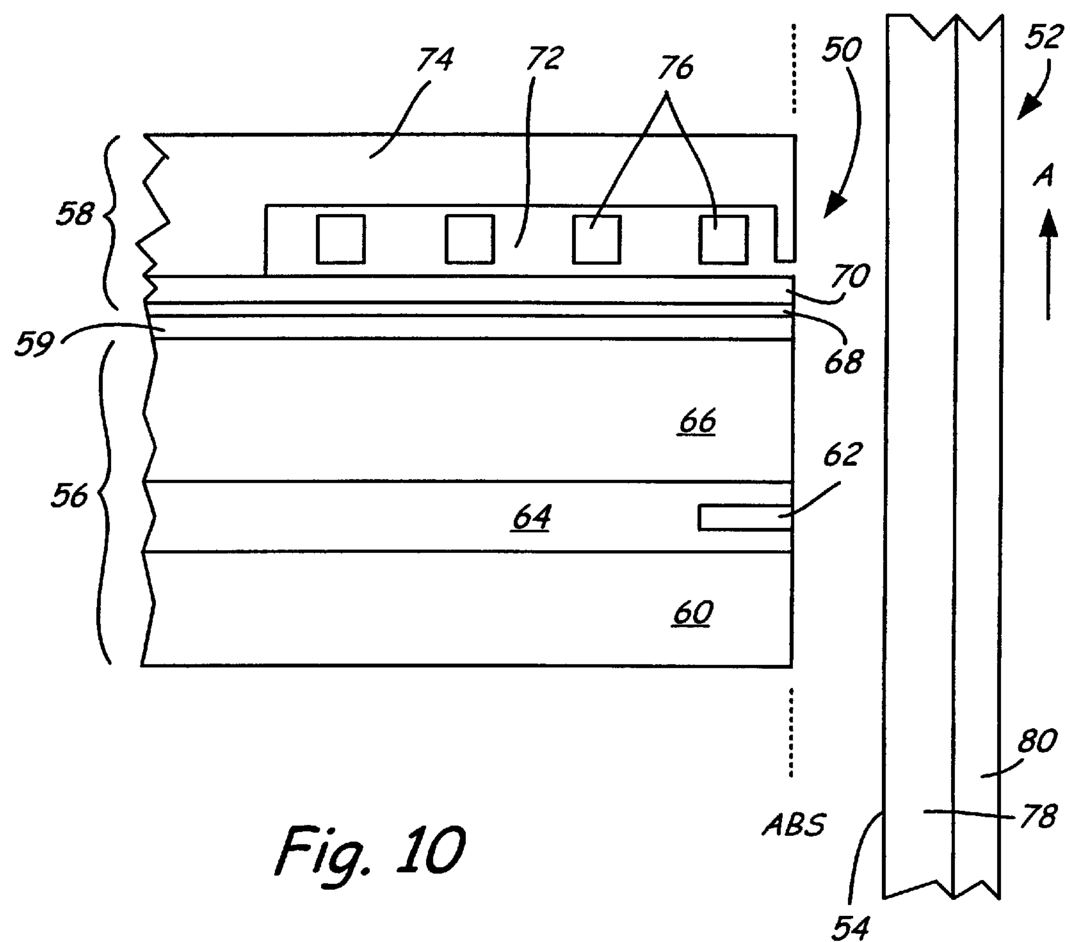
FIG. 10 is a cross-sectional view of an alternate embodiment of a transducing head in accord with the present invention.

FIG. 10 is a cross-sectional view of transducing head 50 and magnetic disc 52 in accord with an alternate embodiment of the present invention. The cross-section of FIG. 10 is taken substantially normal to the ABS of transducing head 50. FIG. 10 illustrates transducing head 50 and its placement relative to magnetic disc 52. The ABS of transducing head 50 faces disc surface 54 of magnetic disc 52. Magnetic disc 52 travels or rotates in a direction relative to transducing head 50 indicated by arrow A. The spacing between the ABS of transducing head 50 and disc surface 54 is preferably minimized while avoiding contact between transducing head 50 and magnetic disc 52. In most cases, contact between transducing head 50 and magnetic disc 52 would destroy both magnetic transducing head 50 and magnetic disc 52.

Transducing head 50 includes MR reader 56 and perpendicular writer 58 separated by insulating layer 59. MR reader 56 includes bottom shield 60, MR read element 62, insulating layer 64, and top shield 66. MR read element 62 is positioned within insulating layer 64 adjacent to the ABS between terminating ends of bottom shield 60 and top shield 66. Bottom shield 60 and top shield 66 function to ensure that MR read element 62 reads only the information stored directly beneath it on a specific track of magnetic disc 52 by absorbing any stray magnetic fields emanating from adjacent tracks and transitions. MR read element 62 may be any of a variety of different types of read elements, such as an anisotropic MR read element or a giant magnetoresistive (GMR) read element. In operation, magnetic flux from a surface of magnetic disc 52 causes rotation of a magnetization vector of a sensing layer of MR read element 62, which in turn causes a change in electrical resistivity of MR read element 62. The change in resistivity of MR read element 62 can be detected by passing a current through MR read element 62 and measuring a voltage across MR read element 62. Insulating layer 64 insulates MR read element 62 from each of bottom shield 60 and top shield 66.

Perpendicular writer 58 includes main pole seedlayer 68, main pole 70, insulating layer 72, return pole 74, and conductive coil 76. Return pole 74 and main pole 70 are separated from each other at the ABS by insulating layer 72, and are magnetically connected to each other opposite the ABS. Main pole 70 is formed on main pole seed layer 68 opposite insulating layer 59. Electrically conductive coil 76 is positioned at least in part in insulating layer 72 between return pole 74 and main pole 70. Conductive coil 76 wraps around at least one of return pole 74 and main pole 70, such that a flow of electrical current through conductive coil 76 generates a magnetic field in return pole 74 and main pole 70. While FIG. 10 shows a single layer of conductive coils 76, it is understood in the art that several layers of conductive coils may be used separated by several insulating layers. Transducing head 50 is a piggyback MR head in which separate layers are employed as main pole 70 and top shield 66.

To enable data to be perpendicularly recorded, perpendicular magnetic disc 52 generally is formed of two layers: soft magnetic underlayer 80 having high permeability and media layer 78 having high perpendicular anisotropy.

Perpendicular writer 58 of FIG. 10 differs from perpendicular writer 18 of FIG. 1 in that main pole 70 of writer 58 is the leading pole of main pole 70 and return pole 74, while return pole 26 of writer 18 is the leading pole of main pole 30 and return pole 26. Otherwise, the properties of each element of transducing head 50 are similar to those of a corresponding element of transducing head 10.

Although the present invention has been described with reference to preferred embodiments, workers skilled in the art will recognize that changes may be made in form and detail without departing from the spirit and scope of the invention.

What is claimed is:

1. A perpendicular writer comprising a perpendicular writer pole comprising a nonmagnetic, electrically-conductive, corrosion-resistant seedlayer and a magnetic layer plated upon the seedlayer.

2. The perpendicular writer of claim 1 wherein the seedlayer is formed of a material selected from the group consisting of ruthenium, nickel-vanadium, and titanium-tungsten.

3. The perpendicular writer of claim 1 wherein the seedlayer has a thickness less than about 0.1 micrometers.

4. The perpendicular writer of claim 3 wherein the thickness of the seedlayer is greater than about 0.025 micrometers.

5. The perpendicular writer of claim 1 wherein a thickness of the perpendicular writer pole is in a range of about 0.1 micrometers to about 1 micrometer.

6. The perpendicular writer of claim 1 wherein a thickness of the perpendicular writer pole is in a range of about 0.1 micrometers to about 0.5 micrometers.

7. The perpendicular writer of claim 1 wherein a width-to-thickness aspect ratio of the perpendicular writer pole is in a range of about 0.95 to about 1.05.

8. The perpendicular writer of claim 1 wherein an easy axis magnetic coercivity of the magnetic layer is less than about 3 oersteds.

9. The perpendicular writer of claim 1 wherein an easy axis magnetic coercivity of the magnetic layer is less than about 1 oersted.

10. A perpendicular write head comprising:

a main pole having a nonmagnetic, electrically conductive, corrosion-resistant seedlayer and a magnetic layer plated upon the seedlayer;

a return pole, the return pole being separated from the main pole by a gap at an air bearing surface of the write head and coupled to the main pole opposite the air bearing surface; and conductive coils positioned at least in part between the main pole and the return pole.

11. The perpendicular write head of claim 10 wherein the seedlayer is formed of a material selected from the group consisting of ruthenium, nickel-vanadium, and titanium-tungsten.

12. The perpendicular write head of claim 10 wherein the seedlayer has a thickness less than about 0.1 micrometers.

13. The perpendicular write head of claim 12 wherein the thickness of the seedlayer is greater than about 0.025 micrometers.

14. The perpendicular write head of claim 10 wherein a thickness of the main pole is in a range of about 0.1 micrometers to about 1 micrometer.

15. The perpendicular write head of claim 10 wherein a thickness of the main pole is in a range of about 0.1 micrometers to about 0.5 micrometers.

16. The perpendicular write head of claim 10 wherein a width-to-thickness aspect ratio of the main pole is in a range of about 0.95 to about 1.05.

17. The perpendicular write head of claim 10 wherein an easy axis magnetic coercivity of the magnetic layer is less than about 3 oersteds.

18. The perpendicular write head of claim 10 wherein an easy axis magnetic coercivity of the magnetic layer is less than about 1 oersted.

19. In a perpendicular write head having a magnetic main pole and a magnetic return pole, wherein the main pole is formed of a seedlayer and a magnetic layer plated upon the seedlayer, and wherein the main pole is separated from the return pole by a gap at an air bearing surface of the write head and is in contact with the return pole opposite the air bearing surface, an improvement comprising forming the seedlayer of a nonmagnetic, electrically-conductive, corrosion-resistant material selected to reduce both an easy axis magnetic coercivity and a hard axis magnetic coercivity of the magnetic layer to less than about 3 oersteds.

20. The perpendicular write head of claim 19 wherein the seedlayer is formed of a material selected from the group consisting of ruthenium, nickel-vanadium, and titanium-tungsten.

* * * * *